Patented Apr. 25, 1933

1,905,532

UNITED STATES PATENT OFFICE

HAROLD P. VANNAH, OF WEST PALM BEACH, FLORIDA, ASSIGNOR TO BROWN COMPANY, OF BERLIN, NEW HAMPSHIRE, A CORPORATION OF MAINE

FUNGICIDE

No Drawing.   Application filed August 15, 1929. Serial No. 386,227.

This invention or discovery relates to fungicides and more particularly those fungicides which may be used for the control or elimination of blights which deleteriously affect the growth and yield of solanaceous plants such as potatoes, tomatoes, egg-plants and the like.

There are two forms of so-called blight, popularly known as "early blight" and "late blight" which attack plants of this genus. Both blights, namely, *Alternaria solani* and *Phytophthora infestans* are fungi which affect in respective methods the growth of the plant. The former attacks the leaves and causes the formation of dry leaf tissue therein, whereas the latter causes rot not only of the leaf but of the tuber also. The effects of attacks by either fungus are premature death of the plant, whereby the crop yield is reduced, and with late blight the quality is impaired. For late blight it is usually the custom to apply as protective fungicides what are known as Bordeaux mixtures, either in dry form as a powder, or in wet form, as a suspension or solution, both containing as fungicidal elements some form of copper. For early blight copper is not equally a protective fungicidal element.

As a result of investigation and experimentation, I have discovered that it is possible to immunize plants of the genus named against both forms of blight, by the use of zinc and more particularly in the form of a zinc compound or its salts. The element may be applied to the growing plant either in the form of a suspension or solution or in powder form. It may not be used alone because of its burning effect on the foliage and hence it is mixed or compounded with a neutralizing agent such as the hydrate of lime, magnesia, or dolomite lime. Other specifics may be admixed with or compounded with zinc salts, and of these I prefer to use copper, in the form of a copper compound or its sulphate salt. I prefer to use the added specific of copper when protecting such plants as potatoes, should climatic or environmental conditions be favorable for occurrence of late blight in the area where zinc is simultaneously needed for control of early blight that is liable to attack the crops.

Such fungicides are, as I have stated, applied to the foliage of the plants in any suitable form, dependent upon the location of the field, the character of the soil and other geographical or physical conditions. Where the soil is the character of that found in cultivated areas of the Everglades region of Florida and the weight of the material being transported is a consideration, it is preferable to apply the fungicide in the form of a dust—this being particularly applicable in such regions because of the heavy dew formation—the dust being applied while the foliage of the plant is moist with dew. In other geographical locations where soil of a different character is encountered, the fungicide may be distributed upon the plants in the form of a spray, delivered from a suitable atomizer or sprayer.

While I do not by any means confine myself thereto, I find that zinc, in the form of zinc sulphate ($ZnSO_4$) may be used to the best advantage more particularly in immunizing the plant from the attack of early blight and I find that the best results are secured where hydrated lime is mixed or compounded with the zinc sulphate. The addition of the lime reduces the tendency of the fungicide to burn the foliage. I add further an amount of copper that gives in the final mixture the quantity of metallic copper ordinarily employed for protection against late blight. In this case the proportions of zinc and copper sulphates are substantially the same. In preparing the fungicide for use in powder form, I thoroughly mix together in powder form 6.7 lbs. $ZnSO_4 1H_2O$, 13.3 lbs. $Ca(OH)_2$ and 7 lbs. $CuSO_4 1H_2O$. It is quite desirable that the constituents and the final mixture should be thoroughly pulverized, so that the greater portion will pass through a 300 mesh sieve. By means of an insufflating or dusting apparatus, the powder fungicide may be distributed upon the foliage of the plant, this being accomplished, as I have previously stated, while the foliage is wet, so that the dust will adhere to the leaves and so that a reaction occurring in the presence of water will be obtained. The reaction in the presence of water of the three components produces various complex basic sulphates. These substances upon the foliage act to destroy or kill the spores of the blight fungus when they arrive upon the surface of the immunized leaves. In the work which I have done in raising potatoes in the sawgrass region of the Everglades, I find that excellent results may be obtained by employing approximately 27 lbs. of the dust to one acre, so that the formula which I have previously given, is based on the quantity of the materials per acre.

When the fungicide is to be used in liquid form it may be produced of substantially
About 8.3 lbs. $ZnSO_4 4H_2O$.
About 13.3 lbs. $Ca(OH)_2$,
About 10.0 lbs. $CuSO_4 5H_2O$, and
About 100 gallons of water.

This formula is sufficient for use on one acre. The hydrated lime is suspended in one-third of the volume of the water and the zinc sulphate is dissolved in half of the remainder, the last third being saved for the purpose of dissolving the copper sulphate. The suspension of lime and the solution of zinc sulphate are then preferably poured at equal rates with impinging streams into a vessel. The solution of copper sulphate is next poured into the same vessel slowly and with continued stirring of the final mixture. I have found that while a mixture of zinc and lime give a final product with but little permanency of suspension, a greater permanency of suspension is obtained on the addition of the copper solution.

Certain reactions between the constituents lime, zinc and copper of the dust and the dew on the leaf occur which form complex salts, some of which are double. I find that the combination of zinc, lime and copper in the order named, as solutions, or suspensions, gives a final mixture of basic zinc sulphate and basic copper sulphate. On the other hand, combinations of the solutions in the order of lime, copper and zinc give the double salt, basic copper zinc sulphate. It has developed in experiments that apparently lesser toxicity is obtained with the latter fungicidal compounds. Hence, in order to ensure the presence of a dust, composed of mixtures of the basic zinc sulphate and basic copper sulphate, on the leaves, it is desirable first to make suspensions of the two basic sulphates, by adding lime, zinc, and copper, to water, to produce a suspension of the two basic sulphates, then in a filter press to remove the excess water and leave a paste, and finally to desiccate the paste in a vacuum dryer, and finally to pulverize it to a 300 mesh size. Addition of this dust to wet leaves ensures better adhesion and coverage than is obtained on addition to dry leaves. However, a valuable though lesser toxic effect is obtained by adding the dry constituent mixture of lime, zinc, copper dust, which in the presence of the dew forms considerable amounts of the two separate basic sulphates, but along with them some basic copper zinc sulphate. The same reactions occur in the preparation of the liquid fungicide, prior to addition to the leaf, but by exercise of care in mixing in the lime, zinc, copper sequence one can always get formation of the two separate basic sulphates, which are highly toxic when present simultaneously. In any event, the fungicide in its liquid form, when applied to the leaves, produces substantially the same fungicidal results as the powder fungicide produces when dusted on to the wet foliage, although the control of products of reaction are obtained in the case of the spray simply by sequence of addition in preparation as compared with the need of the cycle of suspension, paste and powder to give the preferred toxicity of dust product. Other conditions being equal, and dew being sufficiently available, the dust has an advantage in producing less brittleness of leaves, than occurs with sprays. When applying the liquid suspension it is preferably sprayed on the foliage under weather and solar conditions in which there will be a rapid removal of the water content so as to insure adhesion of solids to the foliage.

As stated, the preferred cycle for mixing zinc, lime and copper to make a fungicidal, early blight dust is in the order named. That is, first to cause impingement of suspensions of zinc sulphate and lime, and then to impinge against that mixture a mixture of copper sulphate and water. When that is done it is believed that there is produced in the final mixture a basic sulphate of zinc and a basic sulphate of copper. When the streams of copper sulphate solution and milk of lime suspension are impinged upon one another and mixed in the proportions given herein, it appears that the copper sulphate is precipitated by the OH ions afforded by the milk of lime suspension, to produce the insoluble basic sulphate of copper. Now, when a zinc sulphate solution is added to the resulting mass, it is believed that reaction takes place between the zinc sulphate and the precipitated basic sulphate of copper, to produce the complex zinc-copper basic sulphate. I believe that insoluble basic zinc sulphate, as such, is desirable as a reaction product, inasmuch as it is this product that has been found to prevent early blight. So, too, it is desirable to produce the insoluble basic sulphate of copper, as such, as the reaction product, as it is this material which has been found to prevent late blight. Consequently, the procedure which is regarded as optimum is one which does not result in a reaction between the two salts, namely, the copper and zinc sulphate, to produce the complex copper-zinc basic sulphate.

One may produce a powder from the liquid suspensions, in which the basic sulphates of both zinc and copper exist as such, that is, without interreaction, as follows. A solution of zinc sulphate is commingled with a milk of lime suspension, preferably as impinging streams, to produce the basic zinc sulphate of optimum fungicidal properties, which comes down as a bulky, flocculent precipitate, white in color. This precipitate tends to settle out, leaving a supernatant, clear, aqueous layer, if it is permitted to stand for a while. Immediately after the precipitation of the basic sulphate of the zinc, the copper sulphate may be added, whereupon it undergoes reaction with any remaining lime (preferably present in proportions sufficient to ensure complete reaction) to produce the basic sulphate of copper. The mixture, when allowed to stand, results in a settling out of the mixed precipitates, leaving a supernatant, clear, aqueous layer, which is decanted. The precipitates are dried and, if required, reduced to pulverulent form.

While I have given the relative proportions of the several ingredients of the fungicide which I find will produce optimum results, nevertheless, it will be understood that variations in the proportions may be made to suit the peculiar condition or requirement. Particularly, for the treatment of plants to prevent early blight alone, the copper salt may be omitted. In such case the proportions of the lime and zinc compound are varied in making the dust. For treatment of plants for the prevention of early blight, I may use equal quantities of zinc sulphate and of lime, but preferably an excess of lime.

In lieu of using the sulphate form of zinc, one may employ an equivalent quantity of zinc oxychloride prepared from molecular quantities of zinc chloride and caustic soda in water. In its liquid form zinc oxychloride is feasible for use alone as a liquid fungicide, preferably in a one per cent solution, in which case, about one hundred gallons of the liquid usually suffices for about one acre. In the form of a dry powder, the zinc oxychloride may be dusted upon the plants for fungicidal purposes. Ordinarily, however, it is preferable to employ a carrier or vehicle for the zinc oxychloride, and, when a solid carrier or vehicle is used, it should ordinarily be inert. For this purpose, one may use finely ground diatomaceous earth, talc, fuller's earth, kaolin, tripoli or the like. A solution of the zinc oxychloride is mixed with the inert carrier to form a homogeneous paste after which the water is removed and the residuum crushed to form an impalpable powder. This powder may be used alone as a dry fungicide and dusted upon the plant. If it is to be employed in combination with copper sulphate and lime, however, it may be thoroughly mixed with the quantities of copper sulphate and lime, which would be employed for an equivalent amount of zinc sulphate.

Thus zinc, either in the form of sulphate or oxychloride, furnishes a compound which is effective, when used alone or compounded with copper sulphate and hydrated lime.

I have found that the zinc compound as a 1% solution has a direct toxic action on the fungi but that when used alone or in too large quantities in relation to accessory lime, it effects a burning of the foliage. Both the copper and the zinc sulphates have an acid reaction and the action of the acid upon the leaf is to burn it. By the addition of an excess of lime, however, the acidity is neutralized, and, moreover, the lime forms with these acid salts, basic compounds which do not burn the leaves. Also it may be added that the presence of the lime (which becomes permanently carbonated in situ) effects a better adhesion of the zinc and copper elements of the fungicide to the leaf.

As the result of using the zinc-containing fungicide, herein described, for the treatment of solanaceous plants, I have secured a better yield and a better quality of the product, and I have secured these results in areas of treated fields which were completely surrounded by plants so fully infected that negligible yields were given there, and I have secured a higher ratio of larger sized tubers due to the ability of the immunized plant to obtain a longer period of growth.

It would appear from crops which I have raised that it is unnecessary to treat the plants until they have reached a certain growth or certain degree of maturity. Then the spraying or dusting may be carried on at intervals of ten days or two weeks depending upon the climate, the soil and the rapidity of the growth. Of course, it will be understood that to the fungicide there may be added various insecticides, so that the plant may be treated both for the prevention of fungus growths as well as for the destruction of insect life. Arsenical compounds, fluosilicates, and other suitable insecticides may be mixed with the spray or in dry form may be added to the powder.

Although I have referred more particularly to the immunization of solanaceous plants against *Alternaria solani* and *Phytophthora infestans*, yet the fungicide herein described is toxic to micro-organisms which produce a blighting effect upon such plants as peppers and okra.

What I claim is:

1. A process of making from zinc sulphate and copper sulphate a composition in which basic sulphates of both zinc and copper exist as such, which comprises forming independent solutions of zinc sulphate and copper sulphate, forming an aqueous alkaline medium containing alkaline earth oxide and of an alkalinity to precipitate basic sulphates from both sulphate solutions, adding the zinc sulphate solution to the alkaline medium to precipitate first the zinc basic sulphates, and then adding the copper sulphate solution to precipitate the copper basic sulphate.

2. A process of making from zinc sulphate and copper sulphate a composition in which basic sulphates of both zinc and copper exist as such, which comprises forming independent solutions of zinc sulphate and copper sulphate, forming a milk of lime suspension of a basicity to precipitate basic sulphate from both sulphate solutions, commingling the zinc sulphate solution with the suspension to precipitate the basic sulphate of zinc, and commingling the copper sulphate solution with the resulting mixture to precipitate a basic sulphate of copper.

3. A process of making from zinc sulphate and copper sulphate a composition in which basic sulphate of both zinc and copper exist as such, which comprises forming independent solutions of zinc sulphate and copper sulphate, forming a milk of lime suspension of a basicity to precipitate basic sulphate from both sulphate solutions, commingling the zinc sulphate solution with the suspension to precipitate the basic sulphate of zinc, commingling the copper sulphate solution with the resulting mixture to precipitate a basic sulphate of copper, allowing the mixed precipitate to settle, removing the supernatant aqueous layer, and drying the mixed precipitate.

In testimony whereof I have affixed my signature.

HAROLD P. VANNAH.